US006330333B1

(12) United States Patent
Mizikovsky et al.

(10) Patent No.: US 6,330,333 B1
(45) Date of Patent: Dec. 11, 2001

(54) CRYPTOGRAPHIC SYSTEM FOR WIRELESS COMMUNICATIONS

(75) Inventors: Semyon B. Mizikovsky, Union; James Alexander Reeds, III, New Providence, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/498,714

(22) Filed: Jul. 3, 1995

(51) Int. Cl.[7] .................................................. H04N 7/167
(52) U.S. Cl. .......................... 380/207; 380/264; 380/205; 380/206; 380/210
(58) Field of Search .................................... 380/264, 270, 380/28, 29, 43, 207, 205, 206, 210

(56) References Cited

U.S. PATENT DOCUMENTS

| | | | |
|---|---|---|---|
| 3,239,294 | 3/1966 | Flanders et al. | 312/27 |
| 3,515,805 | 6/1970 | Fracassi et al. | 380/46 |
| 3,639,690 | * 2/1972 | Braun et al. | 380/43 |
| 4,369,434 | 1/1983 | Mueller . | |
| 4,573,205 | * 2/1986 | Nash | 380/252 |
| 4,608,455 | * 8/1986 | McNair | 380/43 |
| 5,060,265 | 10/1991 | Finkelstein | 380/46 |
| 5,153,919 | 10/1992 | Reeds, III et al. | 380/44 |
| 5,159,634 | 10/1992 | Reeds, III | 380/42 |
| 5,172,414 | 12/1992 | Reeds, III et al. | 380/45 |
| 5,204,902 | 4/1993 | Reeds, III et al. | 380/248 |
| 5,319,712 | 6/1994 | Finkelstein et al. | 380/44 |
| 5,365,585 | 11/1994 | Puhl et al. | 380/265 |
| 5,742,678 | * 4/1998 | Dent et al. | 380/270 |
| 5,771,288 | * 6/1998 | Dent et al. | 380/270 |

FOREIGN PATENT DOCUMENTS

| | | |
|---|---|---|
| 0 446 194 | 1/1991 | (EP) . |
| 0446194 | 9/1991 | (EP) . |
| WO 95 06373 | 3/1995 | (WO) . |
| WO9506373 | 3/1995 | (WO) . |

OTHER PUBLICATIONS

"Mobile Station—Base Station Compatibility Standard for Dual—Mode Spread Spectrum Cellular System", PN–3421 (to be published as IS–95a), 12/94, pp. 6–1 through 6–18 and 7–1 through 7–12.

"Applied Cryptography—Protocols, Algorithms, and Source Code in C", Bruce Schneier, John Wiley and Sons, 1994, pp. 219–272.

"Shift Register Sequences", Solomon W. Golomb et al, Holden–Day, Inc., 1967, p. 17.

"On a Scrambling Property of Feedback Shift Registers", Ulf Henriksson, IEEE Transactions on Communications, Oct. 1972, pp. 998–999.

\* cited by examiner

Primary Examiner—Thomas R. Peeso
(74) Attorney, Agent, or Firm—DeMont & Breyer, LLC (57) ABSTRACT

A wireless communications system (110) with increased privacy. The system (110) transmits an encrypted signal between a base station (112) and a wireless terminal (122). In the forward channel, the base station (112) includes an encryptor (130) with a long code mask generator (200) that generates a rolling long code mask. The wireless terminal (122) similarly includes a decryptor (164) with a long code mask generator (208) that creates a rolling long code mask.

7 Claims, 7 Drawing Sheets

CRYPTOGRAPHIC SYSTEM FOR WIRELESS COMMUNICATIONS

CROSS REFERENCE TO RELATED APPLICATION

This application is related to copending U.S. patent application Ser. No. 08/498,713, filed Jul. 3, 1995, entitled *Cryptographic System and Method for Wireless Communications* by J. Reeds and commonly assigned to AT&T Corp., now issued as U.S. Pat. No. 5,727,064.

FIELD OF THE INVENTION

This invention relates in general to the field of communications. More particularly, this invention relates to a cryptographic system for wireless communications.

BACKGROUND OF THE INVENTION

Every day, millions of users communicate with wireless systems. Such communications include voice and data transmissions. Most, if not all, users of these systems do not want the content of the communication to be publicly available. Rather, users generally desire to keep the content of the communication private. Unfortunately, without proper cryptographic precautions, interlopers can easily eavesdrop on communications in some wireless systems. For example, most analog wireless systems do not protect communications from interception. An eavesdropper can access the substance of the transmission by simply tuning a radio to the proper frequency.

Some current digital wireless communication systems take precautions to protect the privacy of users. For example, the Telecommunications Industry Association is drafting a standard for a spread spectrum wireless communications system. The current version of the draft standard was published in December of 1994 as *Mobile Station—Base Station Compatibility Standard for Dual—Mode Spread Spectrum Cellular System* marked PN-3421 (to be published as IS-95a) (hereinafter the "Draft Standard") the teachings of which are incorporated herein by reference. The spread spectrum system described in the Draft Standard is referred to colloquially as Code Division Multiple Access, or CDMA. The Draft Standard includes plans for encrypting voice or data signals prior to transmission for added privacy. Thus, only the true recipient of the voice or data transmission should obtain the content of the transmission.

SUMMARY OF THE INVENTION

A previously unrecognized problem with the cryptographic system that is specified by the Draft Standard is that it permits an eavesdropper to easily and quickly cryptanalyze transmissions encrypted according to the Draft Standard and thereby gain access to the substance of the transmission. The forward traffic channel described in the Draft Standard calls for encrypting an input voice or data signal prior to transmission with a key signal. The Draft Standard also specifies that the input signal be combined with the long code sequence in an Exclusive-OR (i.e. mod 2 addition) function to produce an encrypted output signal.

The Draft Standard calls for generating the long code sequence from a publicly known sequence and a private 42-bit pattern, known as the long code mask. The publicly available sequence is placed in what can be conceptualized as a linear shift register. The output of the linear shift register is combined with the bits of the long code mask. The linear nature of the combination causes the long code sequence to depend linearly on the bits of the private long code mask. This enables an eavesdropper to decrypt a wireless communication with access to 42 bits of the long code sequence. The eavesdropper could use the bits from the long code sequence to create 42 linear equations that depend on the 42 unknown bits of the long code mask. However, the Draft Standard does not call for direct transmission of the bits of the long code sequence. Rather, an Exclusive-OR function combines the bits of the long code sequence with the unknown input signal thus corrupting the bits of the long code, sequence. This should diminish the chances that an eavesdropper will successfully cryptanalyze a transmission. This is not the case with the Draft Standard because of the way that the input signal is processed to form frames of 384 bits for error correction.

An eavesdropper can cryptanalyze a transmission by recognizing relationships among the last sixteen bits in each frame of the input signal. Specifically, the eavesdropper can combine selected bits of the input signal from the last sixteen bits in each frame so as to produce modulo-2 sums of zero. By adding (mod 2) the bits of the output signal such that the sum of the corresponding input bits is zero, the eavesdropper can obtain data that represent combinations of bits of the long code sequence. Essentially, the eavesdropper can cancel the effect of the input signal on the output signal. Each bit of the long code sequence is linearly dependent on the 42 bits of the long code mask. Thus, the eavesdropper can combine known bits of the output signal to create equations that are linearly dependent on the bits of the long code mask. Successive frames of data yield 42 equations so as to allow decryption of the communication within less than a second after the communication commences.

Embodiments of the present invention substantially eliminate or reduce the ability of eavesdroppers to cryptanalyze encrypted transmissions. Specifically, exemplary embodiments of the present invention include a long code mask generator that creates a rolling long code mask that changes, with a predetermined frequency. This removes the linearity from the decimated long code sequence and makes it more difficult to determine the long code mask and thus cryptanalyze the encrypted output signal.

BRIEF DESCRIPTION OF THE DRAWING

For a more complete understanding of the present invention and the advantages thereof, reference is now made to the following description taken in conjunction with the accompanying drawings in which like reference numbers indicate like features and wherein.

DETAILED DESCRIPTION

The Telecommunications Industry Association (TIA) sets standards for wireless communications systems. The TIA drafted a standard for a spread spectrum wireless communications system. The system described in the draft standard is referred to as Code Division Multiple Access (CDMA). Part of the draft standard addresses the need for privacy in wireless communications. The current version of the draft standard was published in December of 1994 as *Mobile Station—Base Station Compatibility Standard for Dual—Mode Spread Spectrum Cellular System* marked PN-3421 (to be published as IS-95a) hereinafter the "Draft Standard") the teachings of which are incorporated herein by reference. Upon detailed analysis of the Draft Standard as outlined below, it was discovered that a communication system built in compliance with the Draft Standard is prone to attack by eavesdroppers despite the encryption procedure because of previously unknown weaknesses in the design of the cryptosystem. Embodiments of the present invention can overcome this weakness in the encryption procedure of the Draft Standard by providing a forward channel circuit and method with added security for encrypted communications.

Figure 1:
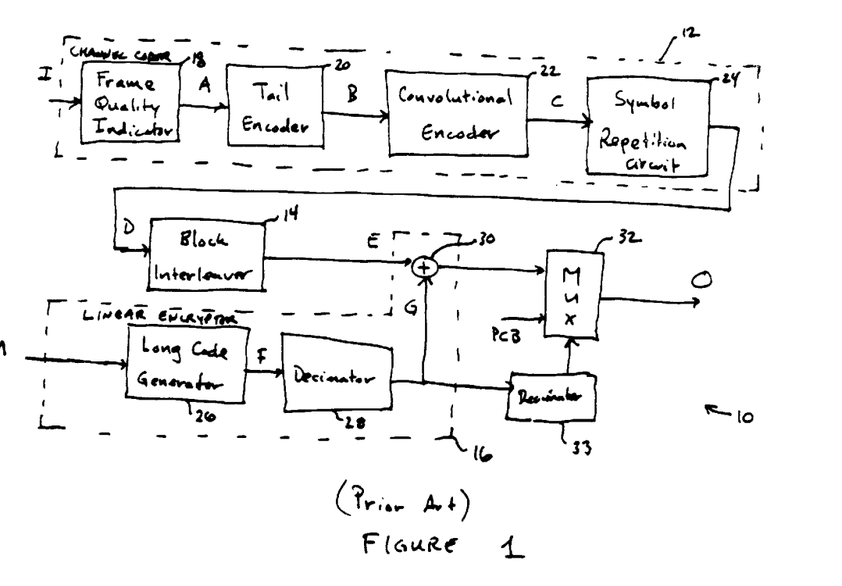
FIG. 1 is a block diagram of a forward channel circuit of a spread spectrum wireless system according to a draft standard published in December 1994 as PN-3421 by the Telecommunications Industry Association.

A detailed examination of the forward channel circuit specified in the Draft Standard provides an understanding of the weakness of the present cryptographic system. FIG. 1 is a block diagram of the forward channel circuit indicated generally at 10 in a base station according to the Draft Standard. Forward channel circuit 10 typically comprises channel coder 12, block interleaver 14 and linear encryptor 16.

Channel coder 12 processes a digital input signal, I. Input signal I may comprise, for example; an encoded digital voice, data or other appropriate signal for transmission in a wireless network. Channel coder 12 and block interleaver 14 minimize the impact on the output of forward channel circuit 10 when consecutive bits of signal I are lost or flipped during transmission. Channel coder 12 typically includes the series combination of frame quality indicator 18, tail encoder 20, convolutional encoder 22, and symbol repetition circuit 24. Channel coder 12, together with block interleaver 14, outputs a processed signal E.

Linear encryptor 16 produces a key signal G to encrypt processed signal E. Linear encryptor 16 typically comprises the series combination of long code generator 26 with decimator 28. Long code generator 26 generates a sequence of bits from a private input signal M referred to as the long code mask. Signal F, output by long code generator 26, is called the long code sequence. Decimator circuit 28 outputs 1 in 64 of the bits of the long code sequence as signal G. The output of decimator 28 is coupled to an input of a modulo-2 adder 30 such as an Exclusive-OR function. Channel coder 12 is also coupled to an input of modulo-2 adder 30. Modulo-2 adder 30 outputs an encrypted version of signal E to a multiplexer 32. A power control bit signal PCB is also provided to multiplexer 32. Multiplexer 32 outputs a signal O as the output of forward channel circuit 10 of FIG. 1. A decimator 33 is coupled between decimator 28 and a control input of multiplexer 32.

In operation, forward channel circuit 10 receives and processes input signal I to provide an encrypted output signal O for transmission. Input signal I is received in frames of bits. The number of bits in each frame may vary based on the information contained in input signal I. For example, each frame in the full data rate case includes 172 bits whereas in the lowest data rate case, each frame includes only 16 bits. Symbol repetition circuit 24 replicates the output of convolutional encoder 22 such that the total number of bits in signal E in each data rate case is the same. To aid in the analysis below, signals E, G, and O are regarded as binary vectors of length 384 bits. Also, each vector has two subscripts. The first subscript, f, refers to the frame of data in producing the vector and the second subscript, j, refers to an element or bit of the vector.

Figure 2:
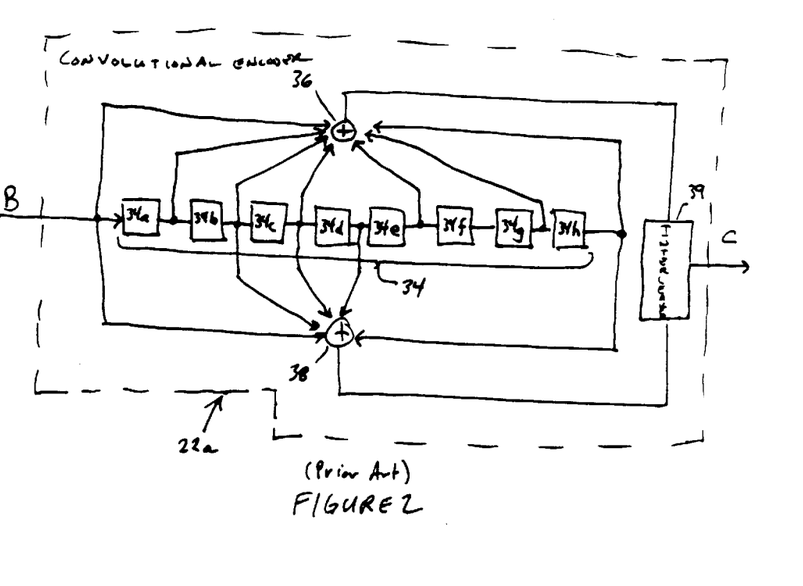
FIG. 2 is a block diagram of a convolution encoder for use in the forward channel circuit of FIG. 1.

Channel coder 12 manipulates input signal I to reduce the effect of burst errors that occur during transmission. Frame quality indicator 18 first creates a signal A by adding a predetermined number of bits to the end of each frame of input signal L Tail encoder 20 creates a signal B by adding a trailing set of 8 bits equal to zero. Convolutional encoder 22 creates a signal C with double the bits of signal B. An exemplary convolutional encoder is indicated generally at 22a in FIG. 2. Convolutional encoder 22a includes a linear shift register 34 that receives signal B from tail encoder 20. Bit positions 34a, 34b, 34c, 34e, 34g and 34h as well as the current bit of signal B are coupled to a modulo-2 adder 36, such as an Exclusive-OR function, to provide a first output of convolutional encoder 22a. Additionally, bit positions 34b, 34c, 34d and 34h as well as the current bit of signal B are coupled to a modulo-2 adder 38, such as an Exclusive-OR function, to provide a second output of convolutional encoder 22a. An interleaver 39 interleaves the two outputs of convolutional encoder 22a to provide output signal C. Thus, the output bits of convolutional encoder 22a, signal C, are a linear combination, e.g. modulo-2 sum, of the bits of signal B. Symbol repetition circuit 24 and block interleaver 26 further operate on signal C to produce signal E. The bits of signal E are arranged in 16 groups of 24 bits. In the full rate the bits of signal E are as shown in TABLE 1 below:

TABLE 1

Interleave Pattern of Interleaver 14 for Full Rate Case

| 1 | 9 | 5 | 13 | 3 | 11 | 7 | 15 | 2 | 10 | 6 | 14 | 4 | 12 | 8 | 16 |
|---|---|---|---|---|---|---|---|---|---|---|---|---|---|---|---|
| 65 | 73 | 69 | 77 | 67 | 75 | 71 | 79 | 66 | 74 | 70 | 78 | 68 | 76 | 72 | 80 |
| 129 | 137 | 133 | 141 | 131 | 139 | 135 | 143 | 130 | 138 | 134 | 142 | 132 | 140 | 136 | 144 |
| 193 | 201 | 197 | 205 | 195 | 203 | 199 | 207 | 194 | 202 | 198 | 206 | 196 | 204 | 200 | 208 |
| 257 | 265 | 261 | 269 | 259 | 267 | 263 | 271 | 258 | 266 | 262 | 270 | 260 | 268 | 264 | 272 |
| 321 | 329 | 325 | 333 | 323 | 331 | 327 | 335 | 322 | 330 | 326 | 334 | 324 | 332 | 328 | 336 |
| 33 | 41 | 37 | 45 | 35 | 43 | 39 | 47 | 34 | 42 | 38 | 46 | 36 | 44 | 40 | 48 |
| 97 | 105 | 101 | 109 | 99 | 107 | 103 | 111 | 98 | 106 | 102 | 110 | 100 | 108 | 104 | 112 |

TABLE 1-continued

Interleave Pattern of Interleaver 14 for Full Rate Case

| 161 | 169 | 165 | 173 | 163 | 171 | 167 | 175 | 162 | 170 | 166 | 174 | 164 | 172 | 168 | 176 |
|---|---|---|---|---|---|---|---|---|---|---|---|---|---|---|---|
| 225 | 233 | 229 | 237 | 227 | 235 | 231 | 239 | 226 | 234 | 230 | 238 | 228 | 236 | 232 | 240 |
| 289 | 297 | 293 | 301 | 291 | 299 | 295 | 303 | 290 | 298 | 294 | 302 | 292 | 300 | 296 | 304 |
| 353 | 361 | 357 | 365 | 355 | 363 | 359 | 367 | 354 | 362 | 358 | 366 | 356 | 364 | 360 | 368 |
| 17 | 25 | 21 | 29 | 19 | 27 | 23 | 31 | 18 | 26 | 22 | 30 | 20 | 28 | 24 | 32 |
| 81 | 89 | 85 | 93 | 83 | 91 | 87 | 95 | 82 | 90 | 86 | 94 | 84 | 92 | 88 | 96 |
| 145 | 153 | 149 | 157 | 147 | 155 | 151 | 159 | 146 | 154 | 150 | 158 | 148 | 156 | 152 | 160 |
| 209 | 217 | 213 | 221 | 211 | 219 | 215 | 223 | 210 | 218 | 214 | 222 | 212 | 220 | 216 | 224 |
| 273 | 281 | 277 | 285 | 275 | 283 | 279 | 287 | 274 | 282 | 278 | 286 | 276 | 284 | 280 | 288 |
| 337 | 345 | 341 | 349 | 339 | 347 | 343 | 351 | 338 | 346 | 342 | 350 | 340 | 348 | 344 | 352 |
| 49 | 57 | 53 | 61 | 51 | 59 | 55 | 63 | 50 | 58 | 54 | 62 | 52 | 60 | 56 | 64 |
| 113 | 121 | 117 | 125 | 115 | 123 | 119 | 127 | 114 | 122 | 118 | 126 | 116 | 124 | 120 | 128 |
| 177 | 185 | 181 | 189 | 179 | 187 | 183 | 191 | 178 | 186 | 182 | 190 | 180 | 188 | 184 | 192 |
| 241 | 249 | 245 | 253 | 243 | 251 | 247 | 255 | 242 | 250 | 246 | 254 | 244 | 252 | 248 | 256 |
| 305 | 313 | 309 | 317 | 307 | 315 | 311 | 319 | 306 | 314 | 310 | 318 | 308 | 316 | 312 | 320 |
| 369 | 377 | 373 | 381 | 371 | 379 | 375 | 383 | 370 | 378 | 374 | 382 | 372 | 380 | 376 | 384 |

It is noted that the numbers in TABLE 1 refer to the bit positions in signal C from convolutional encoder 22. Additionally, each column in TABLE 1 represents one of the 16 groups of 24 bits. The operation of channel coder 12 is public and thus a pontential eavesdropper can access the information contained in TABLE 1.

Figure 3:
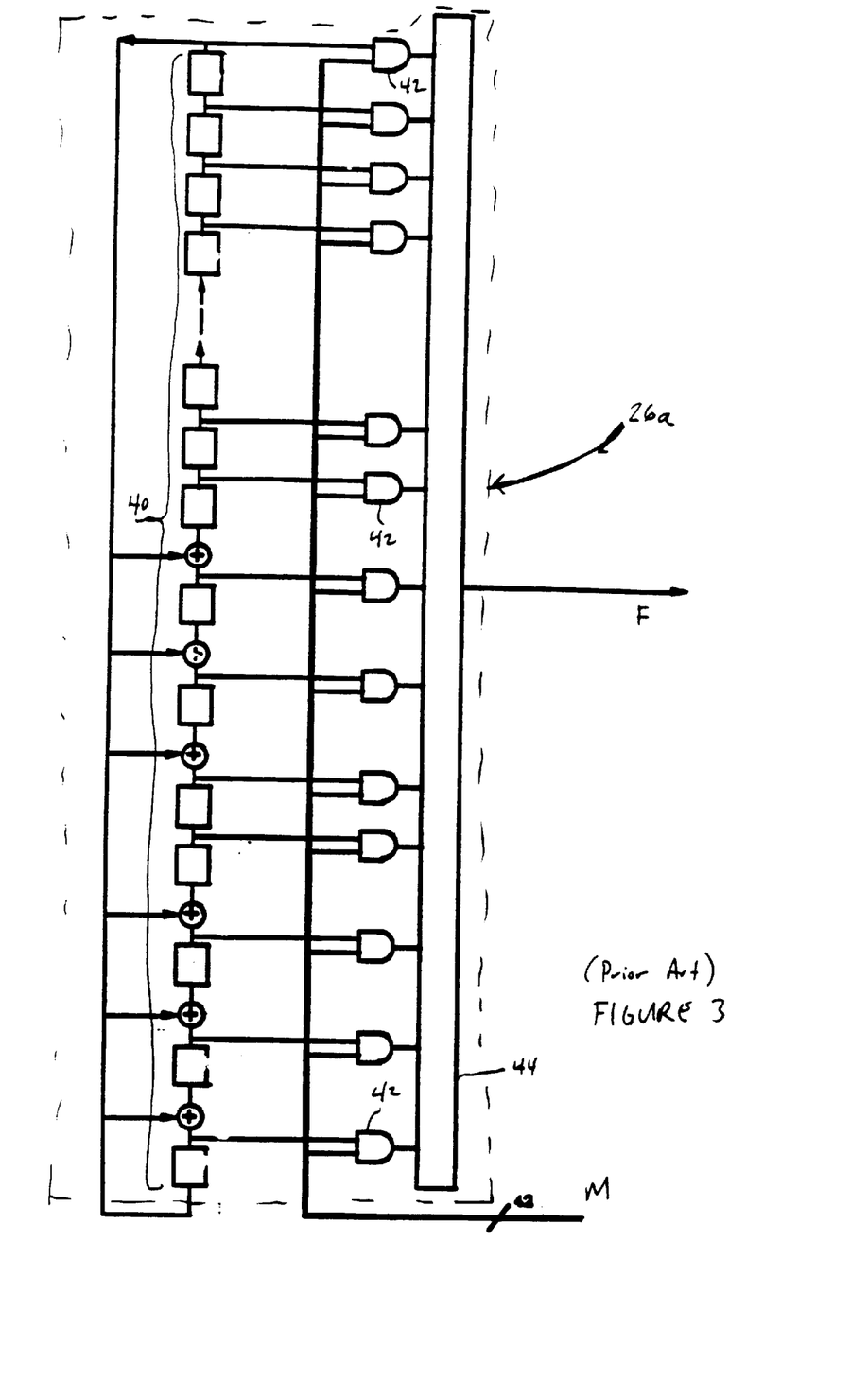
FIG. 3 is a block diagram of an embodiment of a long code generator for use in the forward channel circuit of FIG. 1.

Linear encryptor 16 creates a signal G to be summed (modulo-2) with signal E. Long code generator 26 creates a putatively private long code sequence F from a private long code mask M. An exemplary long code generator indicated generally at 26a is shown in FIG. 3. Long code generator 26a includes a linear feedback shift register 40 that contains a publicly known quantity having 42 bits. Each bit of the shift register is combined in a corresponding AND-gate 42 with a corresponding bit of the private long code mask M. The output of each AND-gate is coupled to an adder 44. Adder 44 comprises a modulo-2 or Exclusive-OR adder. Adder 44 adds the outputs of and-gates 42 together to produce a bit of the long code sequence F. The relationship between F and M can be expressed as:

$$F_{f,j} = \sum_i m_i x_{i,f,j} \tag{1}$$

where $x_{i,f,j}$ is the content of the $i^{th}$ cell of the linear feedback shift register 40 after having stepped j times during the processing of the $f^{th}$ frame, $m_i$ is the $i^{th}$ bit of the long code mask and $F_{f,j}$ is the $j^{th}$ bit of the long code sequence since the beginning of the $f^{th}$ frame. Decimator 28 outputs 1 in every 64 bits of signal F as signal G which is used to encrypt signal E. Thus, each bit of signal G can also be expressed as:

$$G_{f,j} = \sum_i m_i x_{i,f,(64j)}. \tag{2}$$

Signal E from block interleaver 14 is modulo-2 summed with a signal G of linear encryptor 16 at modulo-2 adder 30. Signal E is added to signal G with modulo-2 arithmetic. For each bit output by modulo-2 adder 30, multiplexer 32 transmits either the output of modulo-2 adder 30 or the PCB signal as the output signal O of forward channel circuit 10. The PCB signal is a power control signal that overwrites a pair of the first 17 bits in each group of 24 bits in signal E. Thus, only the last 7 bits of each group of 24 bits in signal O is free of the effect of the PCB signal.

The long code sequence F used to encrypt the transmission is linearly dependent on the long code mask M (Equation (1)).Further, channel encoder 12 manipulates the bits of input signal I such that the bits of signal D are related to the bits of signal I by known, linear algebraic equations. Thus, if a potential eavesdropper can manipulate the output signal O to remove the effect of the input signal I, the eavesdropper will have data that depends linearly on the unknown bits of the long code mask M. With this data, the eavesdropper can use standard techniques for the solution of linear equations to determine the long code mask M.

The bits of signal E output by channel coder 12 can be combined to create linear equations that depend only on the bits of the long code mask M. To see this relationship, consider the mathematical representation of forward channel circuit 10. First, a bookkeeping detail. Due to the effect of the PCB signal, the only bits that the eavesdropper can rely on are the last 7 bits of each group of 24 bits in output signal O. Thus, in the $f^{th}$ frame, for all bit positions j falling into the last 7 bits of each of the groups of bits, the output of forward channel circuit 10 can be described by the equation:

$$E_{f,j} \oplus G_{f,j} = O_{f,j}. \tag{3}$$

In each frame, Equation (3) governs the value of 112 bits of signal I input into forward channel circuit 10. Equation (2) above states that G depends on the unknown bits $m_i$ of the long code mask. The vector E is unknown to the eavesdropper. Thus to create an equation that only depends on $m_i$, the effect of the vector E must be removed. If a vector $\alpha$ can be found such that $\alpha_j$ is zero for all values of j among the first seventeen bits in each group of 24 bits and such that $$<\alpha, E> = 0 \tag{4}$$

then the effect of E on the output vector O can be removed. It is noted that equation (4) refers to the dot product with modulo-2 arithmetic of the vectors $\alpha$ and E. In the vector $\alpha$, the bits are selected such that the dot product with E creates a sum of bits in E that equal zero. Taking the dot product of each vector in Equation (3) with $\alpha$ produces:

$$<\alpha, E> \oplus <\alpha, G> = <\alpha, O>. \tag{5}$$

Substituting Equation (4) into equation (5), it is seen that:

$$<\alpha, G> = <\alpha, O>. \tag{6}$$

As discussed above in Equation (2), signal G is a decimated version of signal F and each bit is thus linearly dependent on the bits of the long code mask $m_i$. Equation (6) can thus be expanded as follows:

$$\sum_j \alpha_j G_{f,j} = \sum_j \alpha_j O_{f,j}.\qquad(7)$$

Substituting equation (2) into equation (7) reveals that:

$$\sum_j \alpha_j \sum_i m_i x_{i,f,(64j)} = \sum_j \alpha_j O_{f,j}\qquad(8)$$

This is a linear equation wherein the bits $m_i$ of the long code mask are the only unknowns. Thus, the eavesdropper can use known techniques to determine the bits of the long code mask provided enough data is gathered to produce 42 equations. The eavesdropper must first identify the vectors $\alpha$ that satisfy Equation (3). Channel coder 12 makes this possible.

To find the vectors a that satisfy Equation (3), trace the last 16 bits of data in a signal B through convolutional encoder 22. Assume the last eight bits are 0 as set by tail encoder 20. Further assume that the prior eight bits are a, b, c, d, e, j, g, and h with a being the bit that is followed by the eight zero bits. Then, the last sixteen bits of signal C are:

$$c_{369}=a\oplus b\oplus c\oplus e\oplus g\oplus h;\qquad(9)$$

$$c_{370}=b\oplus c\oplus d\oplus h;\qquad(10)$$

$$c_{371}=a\oplus b\oplus d\oplus f\oplus g;\qquad(11)$$

$$c_{372}=a\oplus b\oplus c\oplus g;\qquad(12)$$

$$c_{373}=a\oplus c\oplus e\oplus f;\qquad(13)$$

$$c_{374}=a\oplus b\oplus f;\qquad(14)$$

$$c_{375}=b\oplus d\oplus e;\qquad(15)$$

$$c_{376}=a\oplus e;\qquad(16)$$

$$c_{377}=a\oplus c\oplus d;\qquad(17)$$

$$c_{378}=d;\qquad(18)$$

$$c_{379}=b\oplus c;\qquad(19)$$

$$c_{380}=c;\qquad(20)$$

$$c_{381}=a\oplus b;\qquad(21)$$

$$c_{382}=b;\qquad(23)$$

$$c_{383}=a;\qquad(24)$$

and $$c_{384}=a.\qquad(25)$$

Combinations of the bits of signal C that yield a modulo-2 sum of zero satisfy Equation (3). For example, the sum of bits $c_{383}$ and $c_{384}$ is zero because the bits are equal. It is noted that after symbol repetition and interleaving bits 383 and 384 of signal C become bits 192 and 384 of signal E, respectively. Thus, a vector $\alpha$ that results in the sum of these two bits will yield a linear equation in the bits $m_i$ of the long code mask M as follows:

$$G_{f,192}\oplus G_{f,j}=O_{f,192}\oplus O_{f,384}.\qquad(26)$$

Equation (26) can be rewritten as:

$$\sum_i m_i(x_{i,f,(64\cdot192)}\oplus x_{i,f,(64\cdot384)}) = O_{f,192}\oplus O_{f,384}\qquad(27)$$

In Equation (27), the only unknowns are the bits $m_i$ of the long code mask. Other combinations that result in vectors $\alpha$ are as follows:

$$c_{369}\oplus c_{370}\oplus c_{371}\oplus c_{373}\oplus c_{379}\oplus c_{383}=0;\qquad(28)$$

$$c_{377}\oplus c_{378}\oplus c_{379}\oplus c_{381}=0;\qquad(29)$$

$$c_{373}\oplus c_{374}\oplus c_{375}\oplus c_{377}\oplus c_{383}=0;\qquad(30)$$

$$c_{381}\oplus c_{382}\oplus c_{383}=0;\qquad(31)$$

$$c_{371}\oplus c_{372}\oplus c_{373}\oplus c_{375}\oplus c_{381}=0;\qquad(32)$$

$$c_{379}\oplus c_{380}\oplus c_{381}\oplus c_{383}=0;\qquad(33)$$

and $$c_{375}\oplus c_{376}\oplus c_{377}\oplus c_{379}=0.\qquad(34)$$

Thus, in the full rate case, the eavesdropper can create at least eight combinations of bits from one frame of data that cancel the effect of the input signal I on the output A signal O. With just six frames of data the eavesdropper can create more than the 42 equations necessary to determine the value of the 42 bits of the long code mask M. This data can be gathered in less than one second. In the lower rate cases, the task of the eavesdropper is somewhat simplified. TABLE 2 below shows the bits of signal E with the number of the bit position for each bit as in signal C output by the convolutional encoder.

TABLE 2

Interleave Pattern of Interleaver 14 for Low Rate Case

| | | | | | | | | | | | | | | | |
|---|---|---|---|---|---|---|---|---|---|---|---|---|---|---|---|
| 1  | 2  | 1  | 2  | 1  | 2  | 1  | 2  | 1  | 2  | 1  | 2  | 1  | 2  | 1  | 2  |
| 9  | 10 | 9  | 10 | 9  | 10 | 9  | 10 | 9  | 10 | 9  | 10 | 9  | 10 | 9  | 10 |
| 17 | 18 | 17 | 18 | 17 | 18 | 17 | 18 | 17 | 18 | 17 | 18 | 17 | 18 | 17 | 18 |
| 25 | 26 | 25 | 26 | 25 | 26 | 25 | 26 | 25 | 26 | 25 | 26 | 25 | 26 | 25 | 26 |
| 33 | 34 | 33 | 34 | 33 | 34 | 33 | 34 | 33 | 34 | 33 | 34 | 33 | 34 | 33 | 34 |
| 41 | 42 | 41 | 42 | 41 | 42 | 41 | 42 | 41 | 42 | 41 | 42 | 41 | 42 | 41 | 42 |
| 5  | 6  | 5  | 6  | 5  | 6  | 5  | 6  | 5  | 6  | 5  | 6  | 5  | 6  | 5  | 6  |
| 13 | 14 | 13 | 14 | 13 | 14 | 13 | 14 | 13 | 14 | 13 | 14 | 13 | 14 | 13 | 14 |
| 21 | 22 | 21 | 22 | 21 | 22 | 21 | 22 | 21 | 22 | 21 | 22 | 21 | 22 | 21 | 22 |
| 29 | 30 | 29 | 30 | 29 | 30 | 29 | 30 | 29 | 30 | 29 | 30 | 29 | 30 | 29 | 30 |
| 37 | 38 | 37 | 38 | 37 | 38 | 37 | 38 | 37 | 38 | 37 | 38 | 37 | 38 | 37 | 38 |
| 45 | 46 | 45 | 46 | 45 | 46 | 45 | 46 | 45 | 46 | 45 | 46 | 45 | 46 | 45 | 46 |

TABLE 2-continued

Interleave Pattern of Interleaver 14 for Low Rate Case

| 3 | 4 | 3 | 4 | 3 | 4 | 3 | 4 | 3 | 4 | 3 | 4 | 3 | 4 | 3 | 4 |
|---|---|---|---|---|---|---|---|---|---|---|---|---|---|---|---|
| 11 | 12 | 11 | 12 | 11 | 12 | 11 | 12 | 11 | 12 | 11 | 12 | 11 | 12 | 11 | 12 |
| 19 | 20 | 19 | 20 | 19 | 20 | 19 | 20 | 19 | 20 | 19 | 20 | 19 | 20 | 19 | 20 |
| 27 | 28 | 27 | 28 | 27 | 28 | 27 | 28 | 27 | 28 | 27 | 28 | 27 | 28 | 27 | 28 |
| 35 | 36 | 35 | 36 | 35 | 36 | 35 | 36 | 35 | 36 | 35 | 36 | 35 | 36 | 35 | 36 |
| 43 | 44 | 43 | 44 | 43 | 44 | 43 | 44 | 43 | 44 | 43 | 44 | 43 | 44 | 43 | 44 |
| 7 | 8 | 7 | 8 | 7 | 8 | 7 | 8 | 7 | 8 | 7 | 8 | 7 | 8 | 7 | 8 |
| 15 | 16 | 15 | 16 | 15 | 16 | 15 | 16 | 15 | 16 | 15 | 16 | 15 | 16 | 15 | 16 |
| 23 | 24 | 23 | 24 | 23 | 24 | 23 | 24 | 23 | 24 | 23 | 24 | 23 | 24 | 23 | 24 |
| 31 | 32 | 31 | 32 | 31 | 32 | 31 | 32 | 31 | 32 | 31 | 32 | 31 | 32 | 31 | 32 |
| 39 | 40 | 39 | 40 | 39 | 40 | 39 | 40 | 39 | 40 | 39 | 40 | 39 | 40 | 39 | 40 |
| 47 | 48 | 47 | 48 | 47 | 48 | 47 | 48 | 47 | 48 | 47 | 48 | 47 | 48 | 47 | 48 |

It is noted that each bit is repeated eight times. Thus, in the low rate case, the eavesdropper can determine the bits of the long code mask M with a single frame of data. Thus, it is easier in the low rate case to create equations to determine the bits of the long code mask M.

Figure 4:
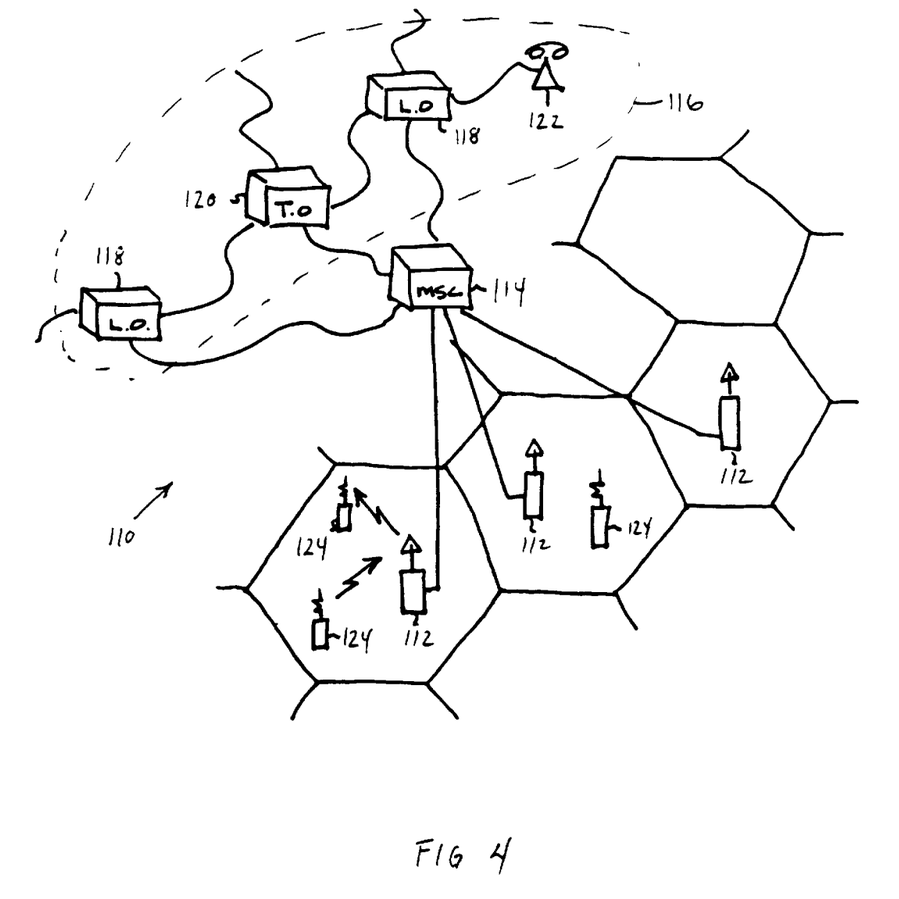
FIG. 4 is a block diagram of a spread spectrum wireless infrastructure incorporating a nonlinear scrambler constructed according to the teachings of the present invention.

FIG. 4 is a block diagram of a wireless system indicated generally at 110 that implements a spread spectrum technology and is constructed according to the teachings of the present invention. Wireless system 110 includes a plurality of base stations 112 that are coupled to and in communication with a Mobile Switching Center (MSC) 114. MSC 114 is coupled to and in communication with the public switched telephone network (PSTN) 116, including one or more local offices 118 and one or more toll offices 120. PSTN 116 further includes fixed terminals 122 coupled to and in communication with local offices 118 and toll offices 120. Fixed terminals may be coupled to PSTN by any appropriate telecommunications cable including, for example, copper wires, fiber optic cables and the like. Wireless system 110 also includes one or more wireless terminals 124. The forward channel of each wireless terminal 124 and each base station 112 includes an encryptor as described below for providing increased transmission privacy when compared to prior systems and methods.

In operation, wireless system 110 transmits an encrypted signal between a base station 112 and a wireless terminal 124. For example, a communication to a wireless terminal 124 may be initiated at a fixed terminal 122. Local office 118 and MSC 114 connect fixed terminal 122 to an appropriate base station 112. Base station 112 encrypts a signal from fixed terminal 122 and transmits the encrypted signal. The appropriate wireless terminal 124 receives the encrypted signal. Wireless terminal 124 decrypts the signal to complete the communication.

Figure 5:
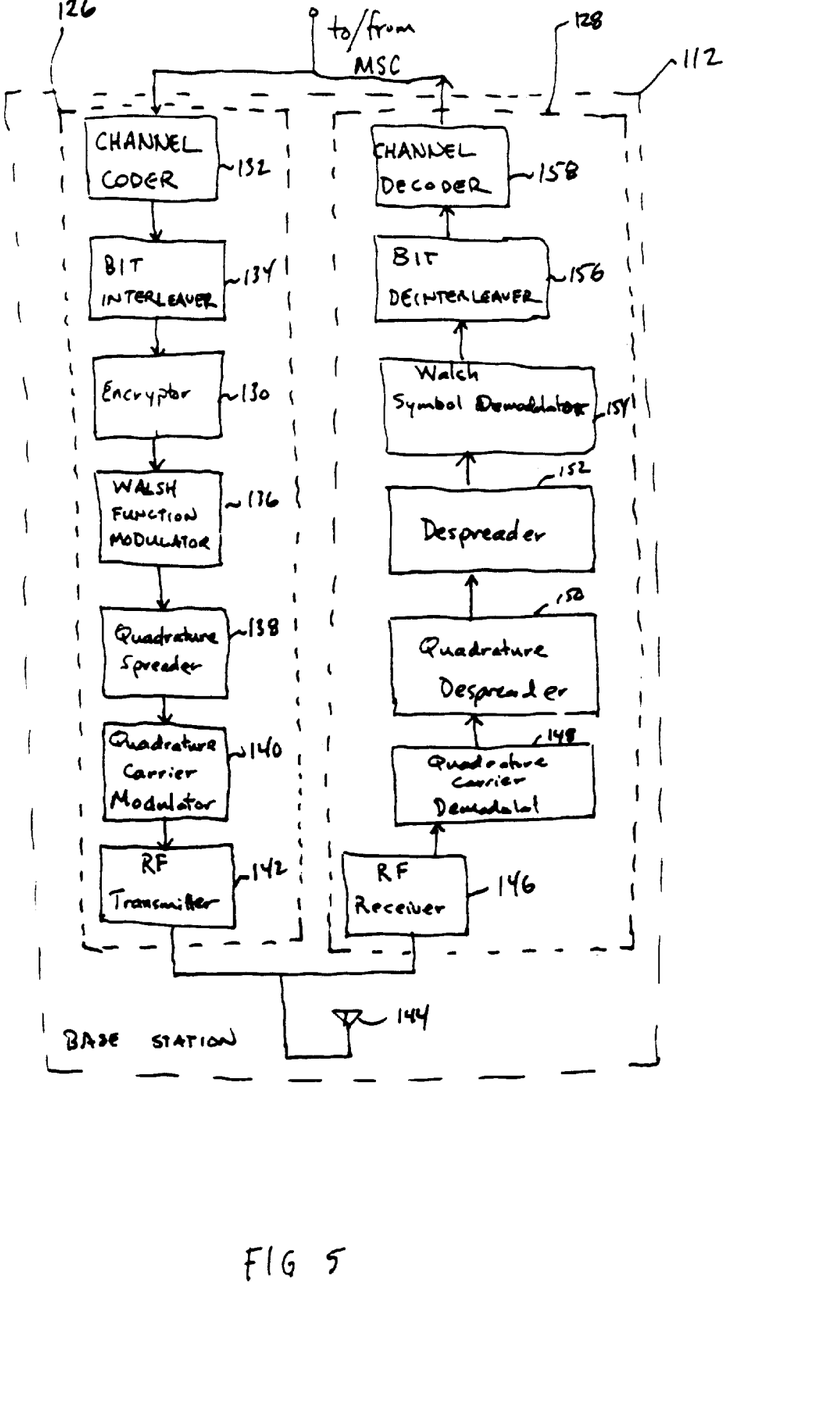
FIG. 5 is a block diagram of a base station in the spread spectrum wireless system of FIG. 4.

FIG. 5 is a block diagram of one embodiment of a base station indicated generally at 112 and constructed according to the teachings of the present invention. Base station 112 includes a forward channel 126 for transmitting signals to a wireless terminal 124. Base station 112 also includes a reverse channel 128 for receiving signals from a wireless terminal 124. Forward channel 126 includes an encryptor 130 that creates a key signal that is a nonlinear function of a private long code mask. Thus, forward channel 126 provides increased transmission privacy.

Forward channel 126 includes a channel coder 132 that is coupled to MSC 114. Forward channel 126 further includes the series combination of bit interleaver 134, encryptor 130, Walsh function modulator 136, quadrature spreader 138, quadrature carrier modulator 140, and RF transmitter 142. RF transmitter 142 is coupled to antenna 144. Reverse channel 128 includes the series combination of RF receiver 146, quadrature carrier demodulator 148, quadrature despreader 150, despreader 152, Walsh symbol demodulator 154, bit deinterleaver 156, and channel decoder 158.

In operation, forward channel 126 processes and encrypts a signal from MSC 114 for transmission on antenna 144. MSC 114 provides a digital signal to channel coder 132. Channel coder 132 codes the signal for error correction after transmission. Bit interleaver 134 rearranges the order of the bits in the signal so as to minimize the impact of error bursts. Encryptor 130 uses a nonlinear key signal to encrypt the signal from bit interleaver 134. Walsh function modulator 136 modulates the signal by multiplying the signal with a selected Walsh function. Quadrature spreader 138 spreads the signal with a selected pseudo-noise (PN) code that is unique to the transmission between fixed terminal 122 and wireless terminal 124. Quadrature carrier modulator 140 modulates the signal for transmission by RF transmitter 142 on antenna 144.

Reverse channel 128 receives a signal from a wireless terminal 124 at antenna 144 and receiver 146. Quadrature carrier demodulator 148 demodulates the signal from the carrier signal for processing. Quadrature despreader 150 uses the appropriate PN signal to despread the signal from wireless terminal 124. Despreader 152 uses a private key signal to further despread the signal from wireless terminal 124. Walsh symbol demodulator 154 demodulates the signal with an appropriate Walsh function. Bit deinterleaver 156 rearranges the bits in the signal to undo an interleaving operation performed by wireless terminal 124. Channel decoder 158 uses error correction techniques to correct errors in the signal from wireless terminal 124.

Figure 6:
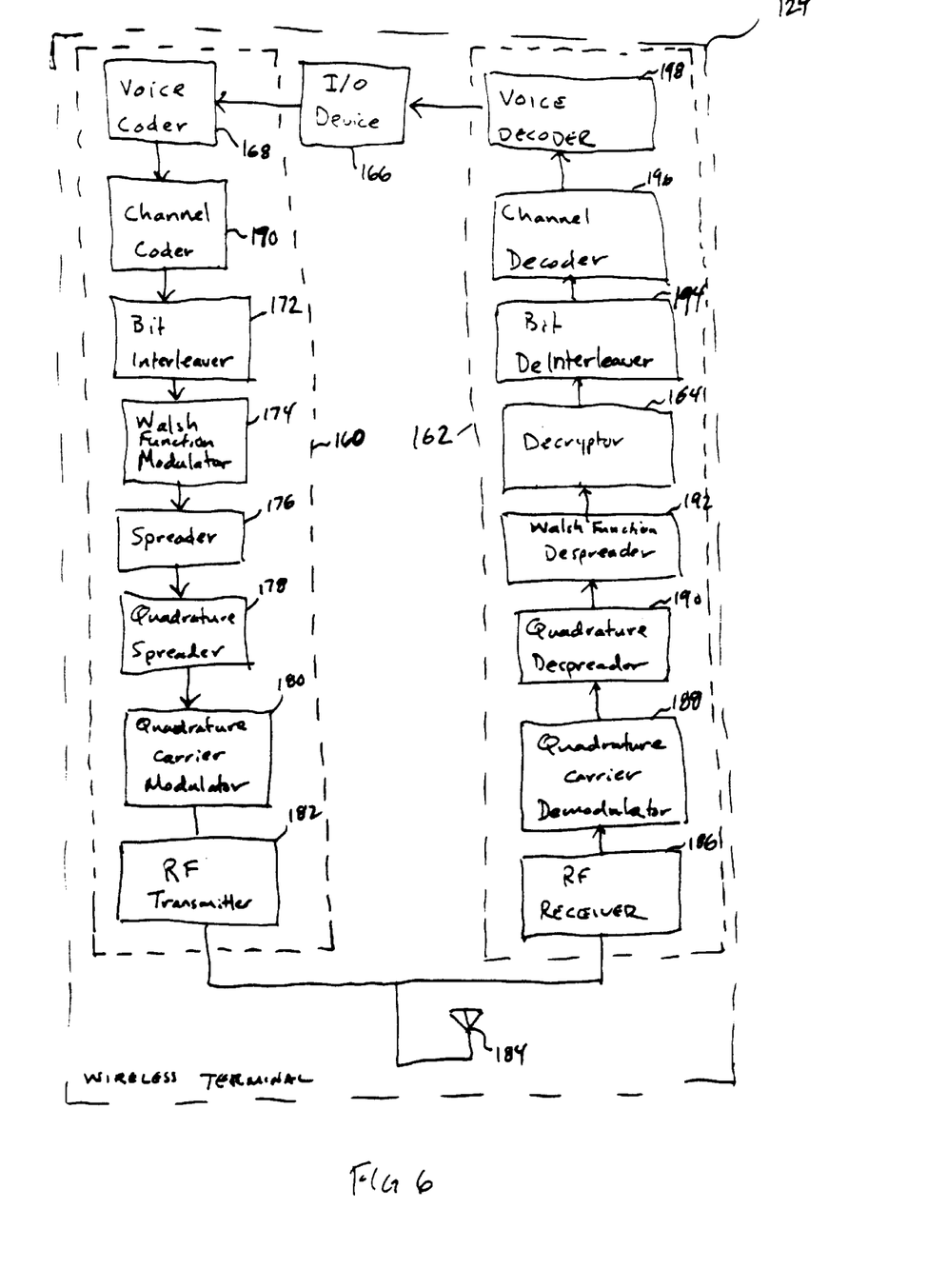
FIG. 6 is a block diagram of a wireless terminal in the spread spectrum wireless system of FIG. 4.

FIG. 6 is a block diagram of a wireless terminal indicated generally at 124 and constructed according to the teachings of the present invention. Wireless terminal 124 includes a reverse channel 160 for transmitting signals to a base station 112. Wireless terminal 124 also includes a forward channel 162 for receiving signals from a base station 112. Forward channel 162 includes a decryptor 164 that creates a key signal that is a nonlinear function of a private long code mask. Thus, forward channel 162 provides increased transmission privacy.

Wireless terminal 168 includes an input/output (I/O) device 166. I/O device 166 may comprise a speaker and a microphone. Alternatively, I/O device 166 may comprise an appropriate data port. Reverse channel 160 includes a voice coder 168 coupled to I/O device 166. Voice coder 168 is coupled to the series combination of channel coder 170, bit interleaver 172, Walsh function modulator 174, spreader 176, quadrature spreader 178, quadrature carrier modulator 180, and RF transmitter 182. RF transmitter 182 is coupled to antenna 184. Reverse channel 162 includes the series combination of RF receiver 186, quadrature carrier demodulator 188, quadrature despreader 190, Walsh function demodulator 192, decryptor 164, bit deinterleaver 194, channel decoder 196 and voice decoder 198. Voice decoder 198 is coupled to I/O device 166.

In operation, reverse channel 160 processes a signal from a user for transmission on antenna 184. Voice coder 168 codes a digital signal from I/O device 166. Channel coder 170 codes the signal for error correction after transmission. Bit interleaver 172 rearranges the order of the bits in the signal so as to minimize the impact of error bursts. Walsh function modulator 174 modulates the signal by multiplying the signal with a selected Walsh function. Spreader 176 uses a key signal to spread the signal from Walsh function modulator 174. Quadrature spreader 178 spreads the signal with a selected pseudo-noise (PN) code that is unique to the transmission between fixed terminal 122 and wireless terminal 124. Quadrature carrier modulator 180 modulates the signal for transmission by RF transmitter 182 on antenna 184.

Forward channel 162 receives a signal from base station 112 at antenna 184 and receiver 186. Quadrature carrier demodulator 188 demodulates the signal from the carrier signal for processing. Quadrature despreader 190 uses the appropriate PN signal to despread the signal from base station 112. Walsh function demodulator 192 demodulates the signal with an appropriate Walsh function. Decryptor 164 uses a private key signal to descramble the signal from base station 112. Bit deinterleaver 194 rearranges the bits in the signal to undo an interleaving operation performed by base station 112. Channel decoder 196 uses error correction techniques to correct errors in the signal from base station 112. Voice decoder 198 decodes the signal for I/O device 166 to complete the transmission.

Figure 7:
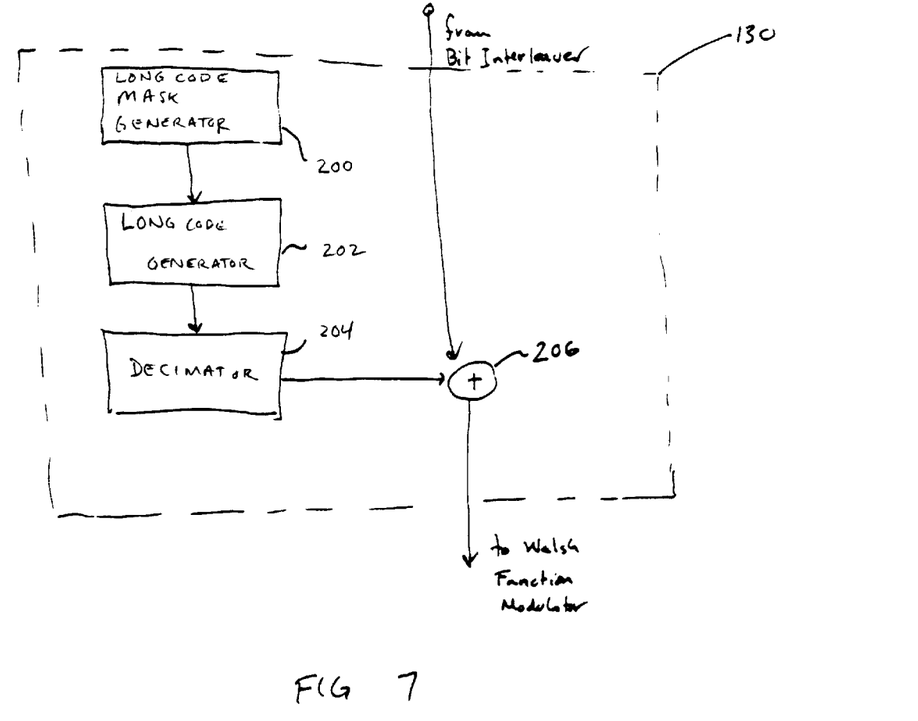
FIG. 7 is an embodiment of an encryptor for use in the base station of FIG. 5.

FIG. 7 is an embodiment of an encryptor indicated generally at 130 for use in forward channel 126 of FIG. 5. Encryptor 130 generates a key signal with the series combination of a long code mask generator 200, a long code generator 202 and a decimator 204. The output of decimator 204 is coupled to a first input of a modulo-2 adder 206. The second input of adder 206 is coupled to bit interleaver 134.

In operation, long code mask generator 200 generates a sequence of bits referred to as the long code mask. Long code mask generator 200 generates a long code mask with a selected frequency such as once per frame of data. Long code generator 202 uses the long code mask to generate a sequence of bits referred to as the long code sequence. Long code generator 202 may comprise the long code generator 22*a* of FIG. 3. The output bits of long code generator 202 do not have a linear dependence on the bits of the long code mask due to the rolling nature of the long code mask. Exemplary embodiments of long code mask generator 200 are described below with respect to FIGS. 9 and 10. Decimator 204 selects bits output from long code generator 202 with a known frequency. For example, decimator 204 may output 1 in 64 of the bits output by long code generator 202. Adder 206 adds (modulo-2) the signal from bit interleaver 134 with the signal from decimator 204.

Figure 8:
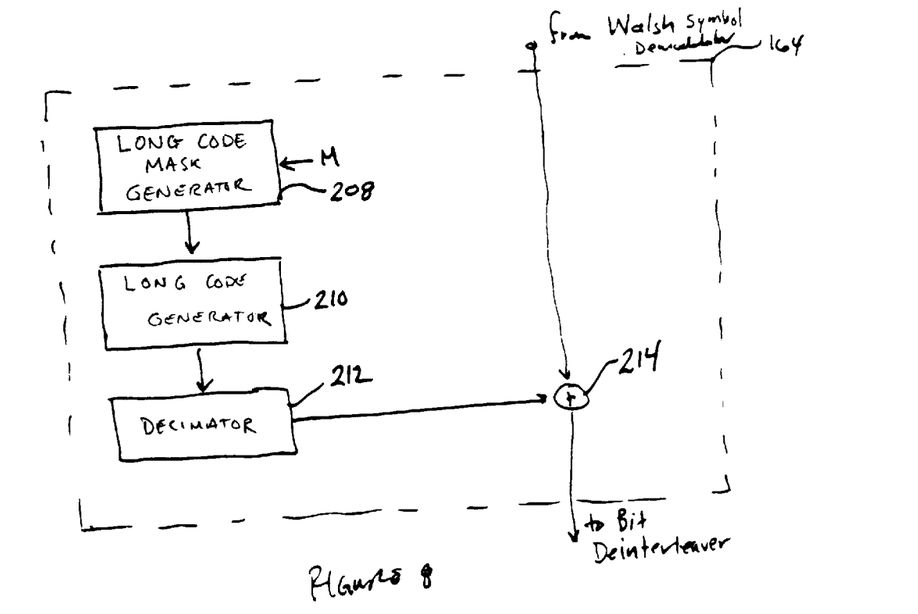
FIG. 8 is an embodiment of a decryptor for use in the wireless terminal of FIG. 6.

FIG. 8 is an embodiment of a decryptor indicated generally at 164 for use in forward channel 162 of FIG. 6. Decryptor 164 generates a key signal with the series combination of long code mask generator 208, long code generator 210 and decimator 212. The output of decimator 212 is coupled to a first input of modulo- 2 adder 214. The second input of adder 214 is coupled to Walsh symbol demodulator 192.

In operation, decryptor 164 creates a key signal to decrypt a signal received from a base station 112. As such, decryptor 164 independently creates a key signal that is identical to the key signal created in encryptor 130. Thus, long code mask generator 208 generates a sequence of bits referred to as a long code mask. Long code mask generator 208 generates a long code mask with a selected frequency such as once per frame of data. Long code generator 210 uses the long code mask to generate a sequence of bits referred to as the long code sequence. Long code generator 210 may comprise the long code generator 22*a* of FIG. 3. The output bits of long code generator 210 do not have a linear dependence on the bits of the long code mask due to the rolling nature of the long code mask. Exemplary embodiments of long code mask generator 208 are described below with respect to FIGS. 9 and 10. Decimator 212 selects bits output from long code generator 210 with a known frequency. For example, decimator 212 may output 1 in 64 of the bits output by long code generator 210. Adder 214 adds the signal from Walsh function demodulator 192 with the signal from decimator 212.

Figure 9:
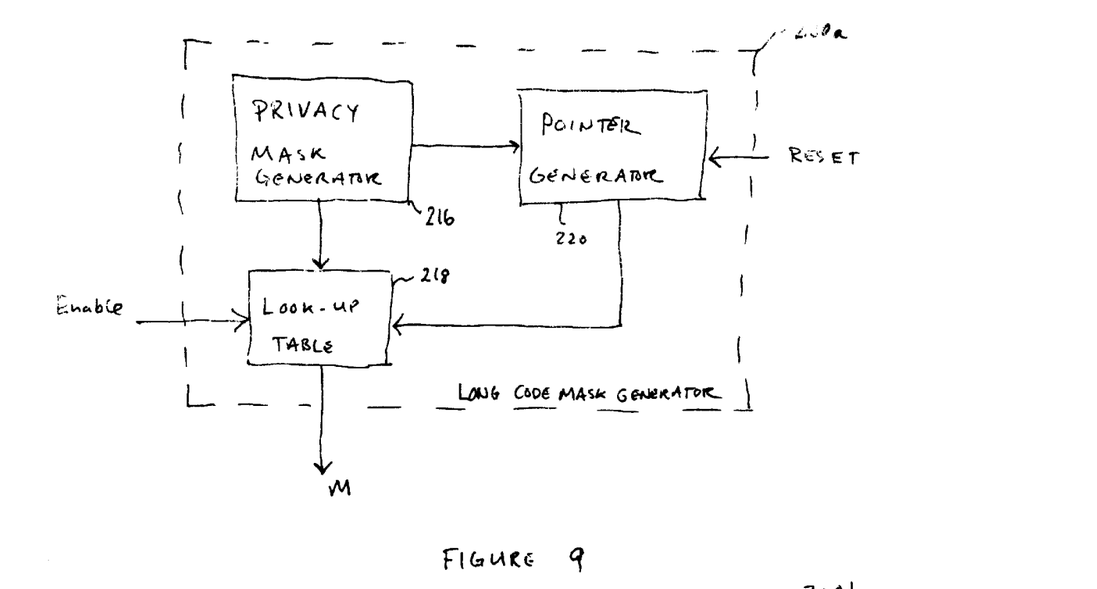
FIG. 9 is an embodiment of a long code mask generator for use in the encryptor of FIG. 7 and the decryptor of FIG. 8.
Figure 10:
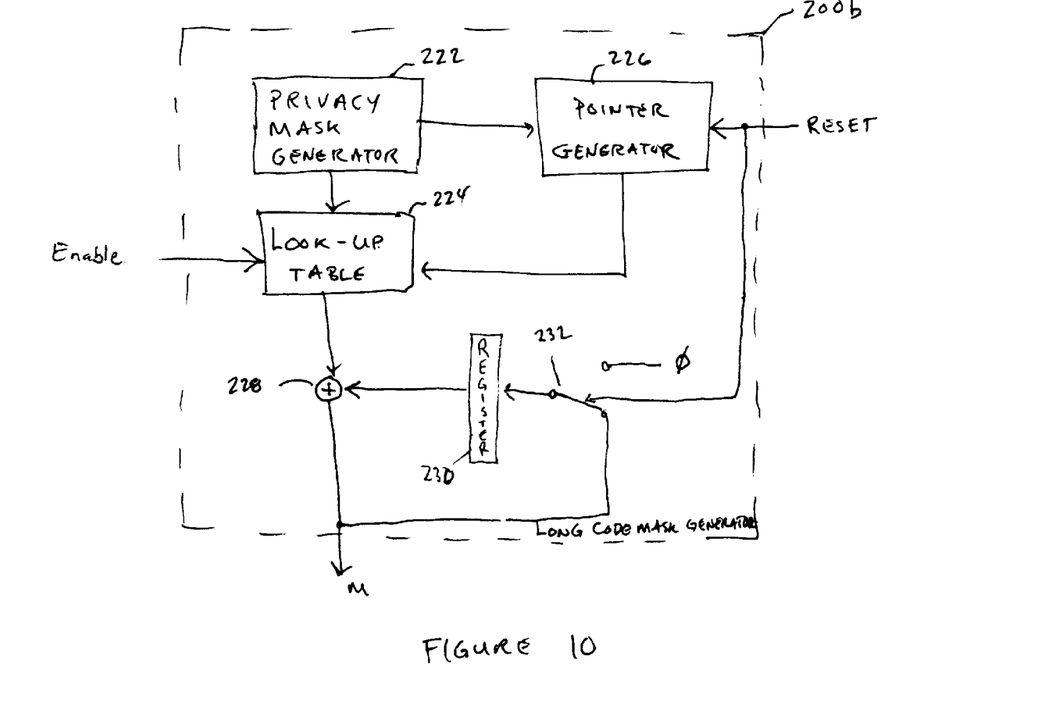
FIG. 10 is another embodiment of a long code mask generator for use in the encryptor of FIG. 7 and the decryptor of FIG. 8.

FIG. 9 is an embodiment of a long code mask generator indicated generally at 200*a* and constructed according to the teachings of the present invention. It is noted that the circuits shown in FIGS. 9 and 10 are described only with respect to encryptor 130. However, the teachings of FIGS. 9 and 10 are equally applicable to decryptor 164. Long code mask generator 200*a* includes a privacy mask generator 216. Privacy mask generator 216 is coupled to a look-up table 218 and a pointer generator 220. Look-up table 218 includes an enable input. Pointer generator 220 includes a reset input. Pointer generator 220 is coupled to provide a pointer or address to look-up table 218. Look-up table 218 provides the long code mask output of long code mask generator 200*a*.

In operation, long code mask generator 200*a* generates a rolling long code mask such that the bits of the long code sequence output by long code generator 202 are not a linear combination of the same bits of the long code mask. Thus, long code mask generator 200*a* increases the difficulty in cryptanalyzing transmissions when compared to the cryptographic system specified in the Draft Standard.

At call set-up, privacy mask generator 216 generates, for example, a 520 bit privacy mask as an integral part of the post-authentication process. It is noted that the number of bits in the privacy mask can be varied to meet the requirements of a specific wireless communication system. With a 520 bit privacy mask, privacy mask generator 216 provides the 512 least significant bits of the privacy mask to look-up table 218. For example, the 512 bits can be organized into 16 words each having 32 bits. Alternatively, the privacy mask may contain any appropriate number of words having any appropriate number of bits per word such as 42 bits as currently specified in the Draft Standard. Privacy mask generator 216 provides the remaining 8 bits to pointer generator 220. Pointer generator 220 generates a pointer corresponding to the address of one of the words in look-up table 218. The word selected by pointer generator 220 is provided, for example, to long code generator 202 of FIG. 7. Pointer generator 220 generates a new pointer with known frequency. For example, pointer generator 220 may generate a new pointer for each frame of data from bit interleaver 134. Thus, long code mask generator 200*a* generates a rolling long code mask for use in encrypting data from bit interleaver 134.

During hand-off, long code mask generator 200*a* takes steps to assure that the long code mask for a wireless terminal 124 is synchronized with the long code mask of a new base station 112. For example, prior to hand-off, a reset signal delivered as part of the signaling message resets pointer generator 220 to an initial, known setting in both base station 112 and wireless terminal 124. Additionally, during the time of the hand-off process, an enable signal that is linked to the reset signal resets the long code mask output by look-up table 218 to a known setting, i.e. the initial setting of the long code mask. Additionally, the enable signal stops long code mask generator 200*a* from rolling the value of the long code mask. Once hand-off is accomplished, the enable signal starts look-up table 218 to begin to output a rolling long code mask.

FIG. 10 is another embodiment of a long code mask generator indicated generally at 200b and constructed according to the teachings of the present invention. Long code mask generator 200b includes a privacy mask generator 222. Privacy mask generator 222 is coupled to a look-up table 224 and a pointer generator 226. Look-up table 224 includes an enable input. Additionally, pointer generator 226 includes a reset input. Pointer generator 226 is coupled to provide an address or pointer to look-up table 224 to control the long code mask output by look-up table 224. The output of look-up table 224 is coupled to a first input to modulo-2 adder 228. A register 230 is coupled between a switch 232 and a second input to adder 228. A first input to switch 232 is coupled to the output of adder 228 to provide a feedback loop. Additionally, a second input to switch 232 is coupled to a low logic value.

In operation, long code mask generator 200b generates a rolling long code mask such that the bits of the long code sequence output by long code generator 202 are not a linear combination of the same bits of the long code mask. Thus, long code mask generator 200b increases the difficulty in cryptanalyzing transmissions when compared to the cryptographic system specified in the Draft Standard.

At call set-up, privacy mask generator 222 generates, for example, a 520 bit privacy mask as an integral part of the post-authentication process. It is noted that the number of bits in the privacy mask can be varied to meet the requirements of a specific wireless communications system. With a 520 bit privacy mask, privacy mask generator 222 provides the 512 least significant bits of the privacy mask to look-up table 218. For example, the 512 bits can be organized into 16 words each having 32 bits. Alternatively, the privacy mask may contain any appropriate number of words having any appropriate number of bits per word such as 42 bits as currently specified in the Draft Standard. Privacy mask generator 222 provides the remaining 8 bits to pointer generator 226. Pointer generator 226 generates a pointer corresponding to the address of one of the words in look-up table 224. The word selected by pointer generator 220 is provided to adder 228 and added (modulo-2) with the content of register 230.

Initially, register 230 is set to contain all low logic values by switch 232. Thus, the initial long code mask is the word selected from look-up table 224 by pointer generator 226. Switch 232 switches so as to provide the current long code mask to register 230. Pointer generator 226 generates a new pointer with known frequency. For example, pointer generator 226 may generate a new pointer for each frame of data from bit interleaver 134. This may be referred to as "rolling" the long code mask. Adder 228 adds (modulo-2) the content of register 230 with the output of look-up table 224 so as to generate the long code mask. Thus, the long code mask depends both on the current output of look-up table 224 and a prior long code mask output by adder 228.

During hand-off, long code generator 200b takes steps to assure that the long code mask for a wireless terminal 124 is synchronized with the long code mask of a new base station 112. For example, prior to hand-off, a reset signal is delivered as part of the signaling message resets pointer generator 226 to an initial, known setting in both base station 112 and wireless terminal 124. Switch 232 is also set so as to fill register 232 with low logic values. Additionally, during the time of the hand-off process, an enable signal that is linked to the reset signal resets the long code mask output by look-up table 224 to a known setting, i.e. the initial setting of the long code mask. Additionally, the enable signal stops long code mask generator 200b from rolling the value of the long code mask. Once hand-off is accomplished, the enable signal starts look-up table 224 to begin to output a rolling long code mask.

Although the present invention has been described in detail, it should be understood that various alterations, substitutions and changes can be made hereto without departing from the spirit and scope of the invention as defined by the appended claims. For example, the encryptors and decryptors described herein can be used without decimators. Alternatively, the function of decimator can be partially or fully incorporated into other circuitry. Additionally, the long code mask can have any appropriate number of bits other than the 42 and 32 bit examples described herein. Furthermore, the privacy mask may have more or less than the 520 bits described herein.

What is claimed is:

1. An apparatus comprising:
   a long code mask generator that generates a long code mask that changes with a selected frequency;
   a long code generator responsive to said long code mask generator that creates a long code sequence from said long code mask;
   a decimator for selecting at least one bit from said long code sequence to create a decimated long code sequence; and
   combinational logic responsive to said long code generator that encrypts an information-bearing signal with said decimated long code sequence.

2. The apparatus of claim 1, wherein said long code mask generator comprises:
   a privacy mask generator that generates and stores a privacy mask;
   a pointer generator that generates an address; and
   a look-up table responsive to address and said privacy mask that outputs a long code mask based on said address and on said privacy mask.

3. The apparatus of claim 1, wherein said long code mask generator comprises:
   a privacy mask generator that generates and stores a privacy mask;
   a pointer generator that generates an address; and
   a look-up table responsive to address and said privacy mask that outputs a long code mask based on said address and on said privacy mask; and
   a feedback loop responsive to said look-up table that is operable to combine the output of said look-up table with a previous output of said long code mask generator to provide a long code mask output.

4. The apparatus of claim 1 wherein said selected frequency is once per frame of data.

5. The apparatus of claim 1 wherein said long code sequence has a non-linear dependence on said long code mask.

6. The apparatus of claim 1 wherein said decimator selects 1 in 64 bits from said long code sequence to create said decimated long code sequence.

7. The apparatus of claim 1 wherein said combinational logic adds modulo-2 said information-bearing signal and said decimated long code sequence.

* * * * *